(12) United States Patent
Fee et al.

(10) Patent No.: US 6,263,306 B1
(45) Date of Patent: Jul. 17, 2001

(54) SPEECH PROCESSING TECHNIQUE FOR USE IN SPEECH RECOGNITION AND SPEECH CODING

(75) Inventors: Michael Sean Fee, New Vernon, NJ (US); Ching Elizabeth Ho, San Marino, CA (US); Partha Pratim Mitra, Jersey City, NJ (US); Bijan Pesaran, Pasadena, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/259,644

(22) Filed: Feb. 26, 1999

(51) Int. Cl.$^7$ ............................. G10L 11/04; G10L 15/02
(52) U.S. Cl. ......................... 704/203; 704/206; 704/207
(58) Field of Search ................................... 704/203, 204, 704/205, 207, 226, 231, 206

(56) References Cited

U.S. PATENT DOCUMENTS

| | | | |
|---|---|---|---|
| 4,217,808 | * 8/1980 | Slepian et al. | 84/454 |
| 4,556,869 | * 12/1985 | Thomson | 341/70 |
| 5,325,427 | * 6/1994 | Dighe | 379/386 |
| 6,124,544 | * 9/2000 | Alexander et al. | 84/616 |

OTHER PUBLICATIONS

D. J. Thomson, "Multiple–window spectrum estimates for non–stationary data," Ninth IEEE SP Workshop in Statistical Signal and Array Processing, Sep. 1998, pp. 344 to 347.*

D. J. Thomson, "Quadratic–inverse estimates of transfer functions," IEEE Sixth SP Workshop on Statistical Signal and Array Processing, Oct. 1992, pp. 432 to 435.*

D.J. Thomson, "An overview of multiple–window and quadratic–inverse spectrum estimation methods," 1994 IEEE International Conference on Acoustics, Speech, and Signal Processing, vol. 6, Apr. 1994, pp. VI/185 to VI/194.*

D.J. Thomson, "Signal extraction via multitaper spectra of nonstationary date," Conference Record of the Thirty–Second Asilomar Conference on Signals, Systems & Computers, vol. 1, Nov. 1998, pp. 271 to 275.*

Nadeu et al., "Frequency averaging: an useful multiwindow spectral analysis approach," 1997 IEEE International Conference on Acoustics, Speech and Signal Processing, vol. 5, Apr. 1997, pp. 3953 to 3956.*

* cited by examiner

*Primary Examiner*—Tālivaldis I. Šmits
*Assistant Examiner*—Martin Lerner

(57) ABSTRACT

A technique for obtaining an intermediate set of frequency dependant features from a speech signal for use in speech processing and in obtaining estimates of speech pitch. The technique utilizes multiple tapers derived from Slepian sequences to obtain a product of the speech signal and the Slepian functions. Multiple tapered Fourier transforms are then obtained from the product, from which the set of frequency dependent features are calculated. In a preferred embodiment, a derivative of the cepstrum of the speech signal is used as an estimate of speech signal pitch. In another preferred embodiment, the F-spectrum is calculated from the product and the F-cepstrum is obtained therefrom by calculating the Fourier transform of the smoothed derivative of the log of the F-spectrum. The maximum of the F-cepstrum also provides a pitch estimation.

7 Claims, 5 Drawing Sheets

SPEECH PROCESSING TECHNIQUE FOR USE IN SPEECH RECOGNITION AND SPEECH CODING

BACKGROUND OF THE INVENTION

1. Field of the Invention

The present invention pertains to a method of processing speech signals for use in speech recognition applications. More particularly, the present invention relates to a technique for calculating from a speech signal an intermediate set of features for use in speech recognition applications and for use in speech pitch estimation.

2. Description of the Related Art

Various signal processing techniques have been developed for analyzing and digitizing speech signals, which can then be used for various control functions, e.g. computer operation, etc. Some such known techniques employ short-time Fourier spectra or "monograms" of a speech signal, which are computed using windowed Fourier transforms, as explained more fully in Rabiner et al., *Fundamentals of Speech Recognition*(1993). The resulting sonograms are then further processed to determine, for example, cepstra, fundamental frequencies, etc. A drawback of such known techniques is that they yield non-robust results.

Another problem in speech analysis is that of automated pitch determination. Knowledge of the pitch contour of a speech signal is essential for various speech applications such as coding, speech recognition and speech synthesis. Most known pitch determination techniques are classified as either time domain based or frequency domain based. Time domain techniques rely on the detection of the fundamental period of oscillation in the speech signal, also known as the peak-to-peak measurement in the amplitude of the speech signal. A drawback of such time-based techniques results from the presence of noise may be missing or disguised.

As for frequency domain techniques, these techniques detect a stack of equally spaced lines in the spectrum of a speech signal. The spacing between the lines is a measurement of pitch. For such frequency domain techniques, noise also presents a problem.

SUMMARY OF THE INVENTION

The present invention is directed to a novel speech processing technique for use in speech recognition and pitch estimation applications. The inventive speech processing technique is implemented by calculating Slepian sequences over a selected time length and frequency width and forming a product of the calculated Slepian sequences with a portion of a subject speech signal or segment. The length of the segment is selected to be equivalent to the time and frequency parameters of the calculated Slepian sequences. Fourier transforms of the product are then calculated to obtain multiple tapered Fourier transforms of the speech segment. A frequency dependent quantity is calculated from the multiple tapered Fourier transforms, which is then used to obtain angular derivatives of the speech spectrogram corresponding to the speech signal, thus defining features of the speech signal for use in speech recognition and coding.

In a preferred embodiment, a robust pitch estimate of the subject speech signal is obtained by calculating Fourier transforms of an estimate of the derivative of the log of the speech segment spectrum to produce a peak when the resulting Fourier transforms are plotted. The position of the peak in the plotted Fourier transform provides an estimate of pitch.

In another preferred embodiment an estimate of the pitch of a speech signal is obtained by calculating an F-spectrum from the Fourier transform of the product of the Slepian functions and speech segment. A smoothed derivative of the logarithm of the F-spectrum is then calculated. Once so calculated, the Fourier transform of the resultant quantity ("F-cepstrum") is obtained, the peak of which represents the pitch estimate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
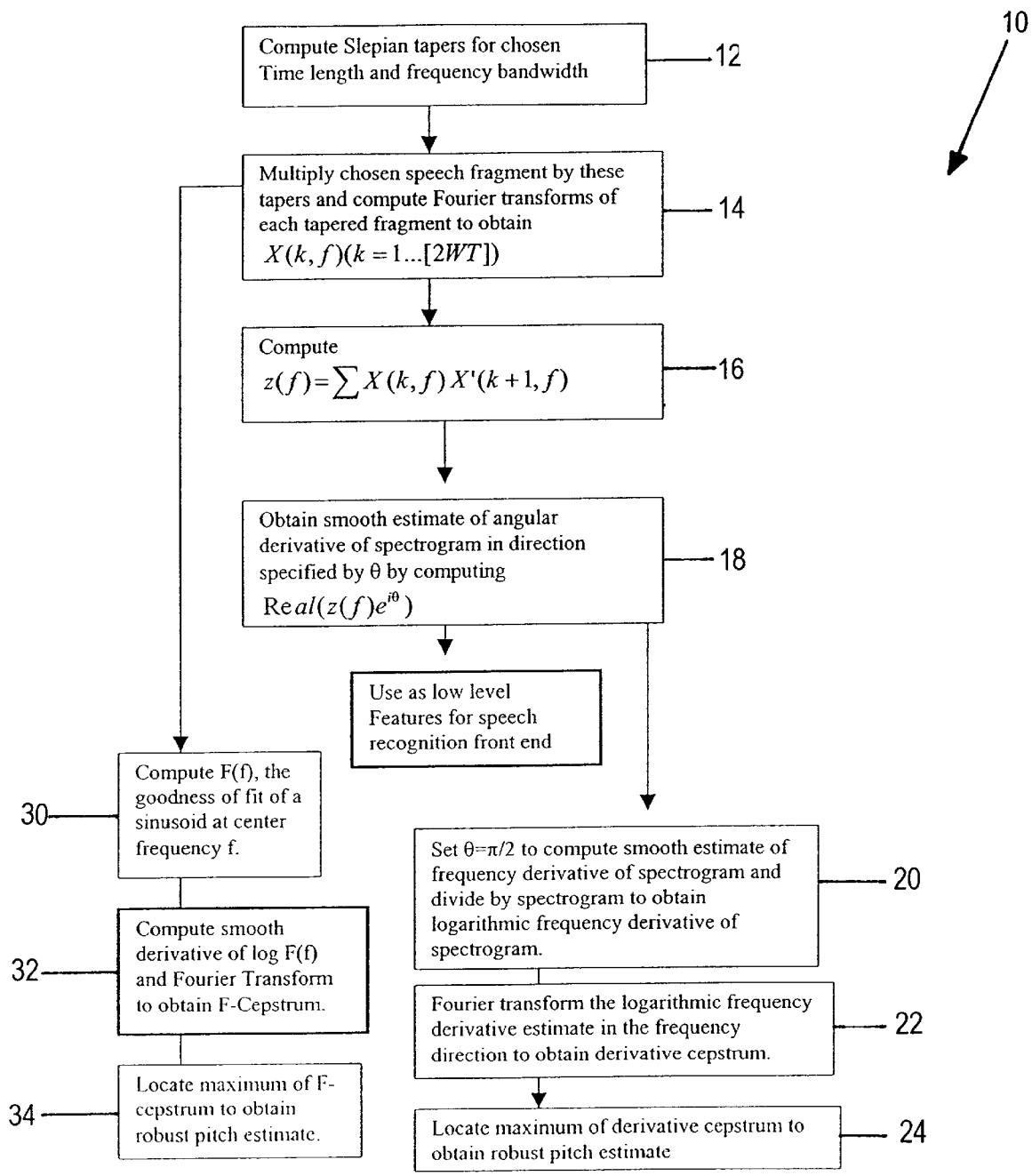
FIG. 1 is a block diagram of a method in accordance with the present invention.

The inventive spectral analysis technique 10 described and claimed herein and depicted in FIG. 1 is based on multiwindow ("multitaper") spectral estimation as described in Thomson, D. J., *Spectral Estimation And Harmonic Analysis*, Proc. IEEE, 70(9): 1055–1096 (1982), which teaches the use of discrete prolate spheroidal sequences, e.g., Slepian functions, as data tapers or windows. The Slepian functions, as is known in the art, are a set of orthogonal functions characterized by time length and a bandwidth parameter, i.e. a frequency width, and arise naturally as a solution to the so-called "spectral concentration" problem described more fully in Slepian, D. and Pollak, H. O., *Prolate Spheriodal Wavefunctions Fourier Analysis and Uncertainty*, Bell Sys. Tech. Journal, 40:43–64 (1961).

For a given frequency half-bandwidth W and length N, there are approximately 2NW Slepian functions, represented by $$w_k(t)(k=1 \ldots [2NW], t=1 \ldots N) \qquad \text{Equation(1)}$$

that have their spectra concentrated in the frequency range [−W, W]. These orthogonal Slepian functions are used to extract the energy of a speech signal contained in a frequency band defined as [f−W, f+W] for a given frequency f. This is achieved by computing multiple tapered Fourier transforms of a data signal or speech signal $x_t$ ($t=1 \ldots N$) by equation (2)

$$\tilde{x}_k(f) = \sum_1^N w_t(k) x_t e^{-2\pi i f t} \quad \text{Equation (2)}$$

Figure 2A:
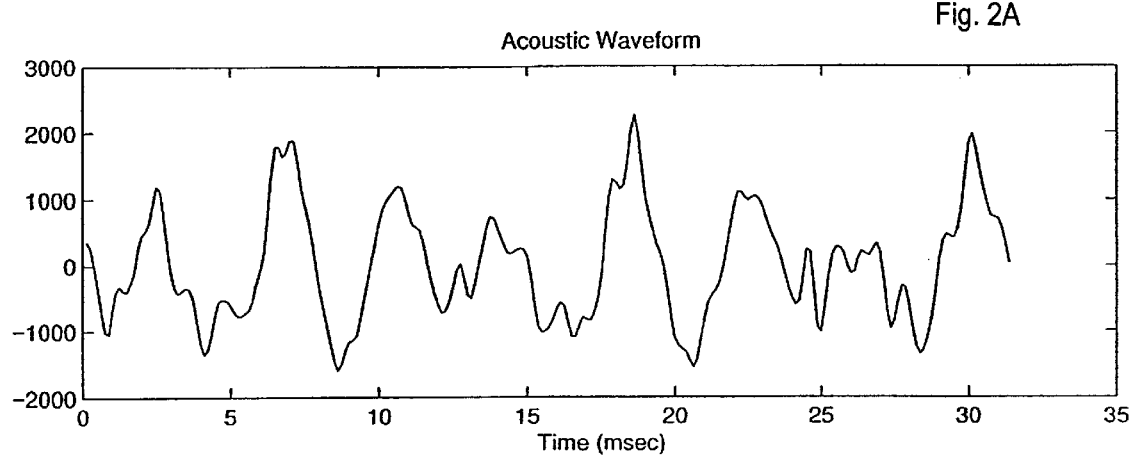
FIG. 2A is a graphical representation of an acoustic waveform.

Utilizing these properties of Slepian functions, the first step of the inventive spectral analysis technique is to compute Slepian tapers or windows for a chosen time length and frequency bandwidth, as shown in step 12 of FIG. 1. Once computed, the calculated Slepian tapers are multiplied by a segment of a subject speech signal (step 14), a representation of which is shown in FIG. 2A. The speech signal segment is selected as having a time length and frequency bandwidth substantially equal to the chosen time length and frequency bandwidth for the calculated Slepian tapers. Fourier transforms of the resultant product are then obtained (step 14) in accordance with equation 1 above, wherein $w_t(k)$ represents the calculated Slepian sequences, and $x_t$ represents the segment of the speech signal.

Estimates of frequency and time derivatives of the spectrum of a speech signal may be robustly obtained using quadratic inverse techniques as more fully described in Thomson, D. J. *Quadratic-Inverse Spectrum Estimates: Applications To Palaeoclimatology, Phil. Trans. Roy. Soc. Lond. A*, 332:539–597 (1990) and Thomson, D. J., *Nonstationary Fluctuations In Stationary Time Series, Proc. SPIE*, 2027:236–244 (1993). These frequency and time derivative estimates have the following general form $$\sum_{k,k'} A_{k,k'} \tilde{x}_k(f) \tilde{x}_{k'}^*(f) \quad \text{Equation (3)}$$

The matrices $A_{k,k'}$ are then approximated in accordance with steps 16 and 18 of the present Invention through computation of the intermediate quantity, $$z(f) = \sum_{k=1}^{K-1} \tilde{x}_k(f) \tilde{x}_{k+1}(f) \quad \text{Equation (4)}$$

Figure 3A:
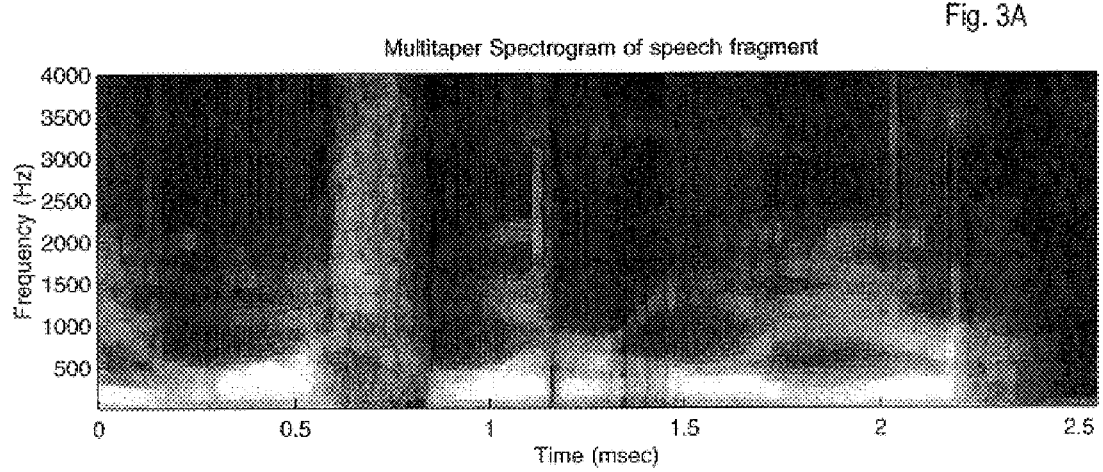
FIG. 3A depicts a multitaper spectrogram of a speech fragment.
Figure 3B:
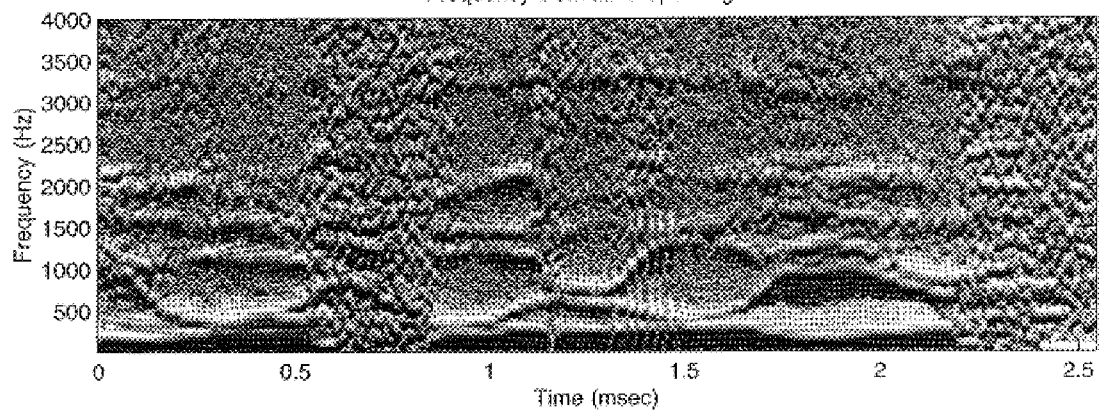
FIG. 3B depicts a frequency derivative of the spectrogram of FIG. 3A.

This value "z" represents a frequency dependent quantity derived from the multiple tapered Fourier transforms of the product of the calculated Slepian functions and the speech signal fragment. Once the frequency dependent quantity "z" is obtained, smooth estimates of the angular derivative of a spectrogram of the speech signal taken in a direction specified by $\theta$ is obtained by computing the real part of $z(f)$ multiplied by $e^{i\theta}$:

$$\text{Re}(z(f)e^{i\theta}) \quad \text{Equation (5)}$$

as shown in step 18. The smooth estimate is then used as low level features for front end speech recognition. Setting $\theta=0$ gives a smoothed estimate of the time derivative of the spectrogram and setting $\theta=\pi/2$ gives a smoothed estimate of the frequency derivative of the spectrogram. FIG. 3A shows an exemplary speech spectrogram and FIG. 3B shows the smoothed estimate of the derivative of the speech spectrogram for a value of $\theta=\pi/2$.

Figure 2B:
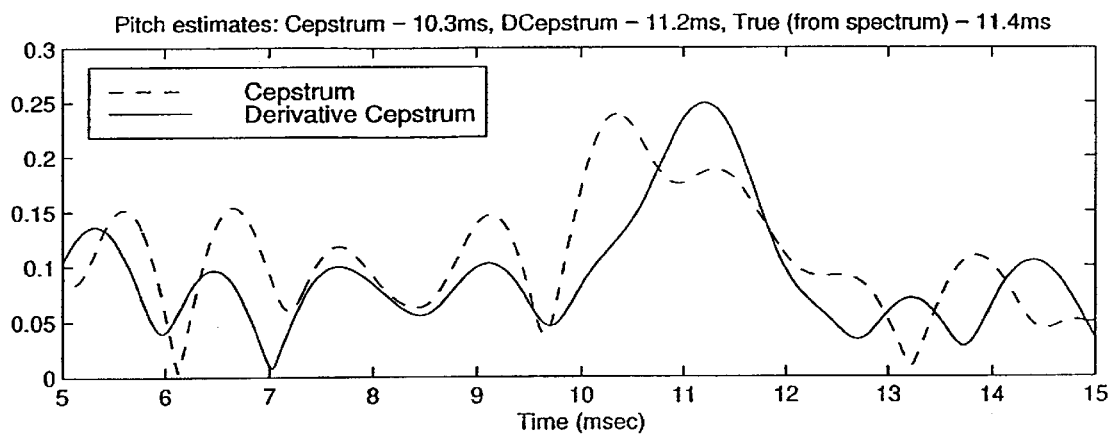
FIG. 2B is a graphical representation of the Fourier transform of the logarithm ("cepstrum") of the acoustic waveform spectrum shown in FIG. 1A, together with the derivative cepstrum.
Figure 2C:
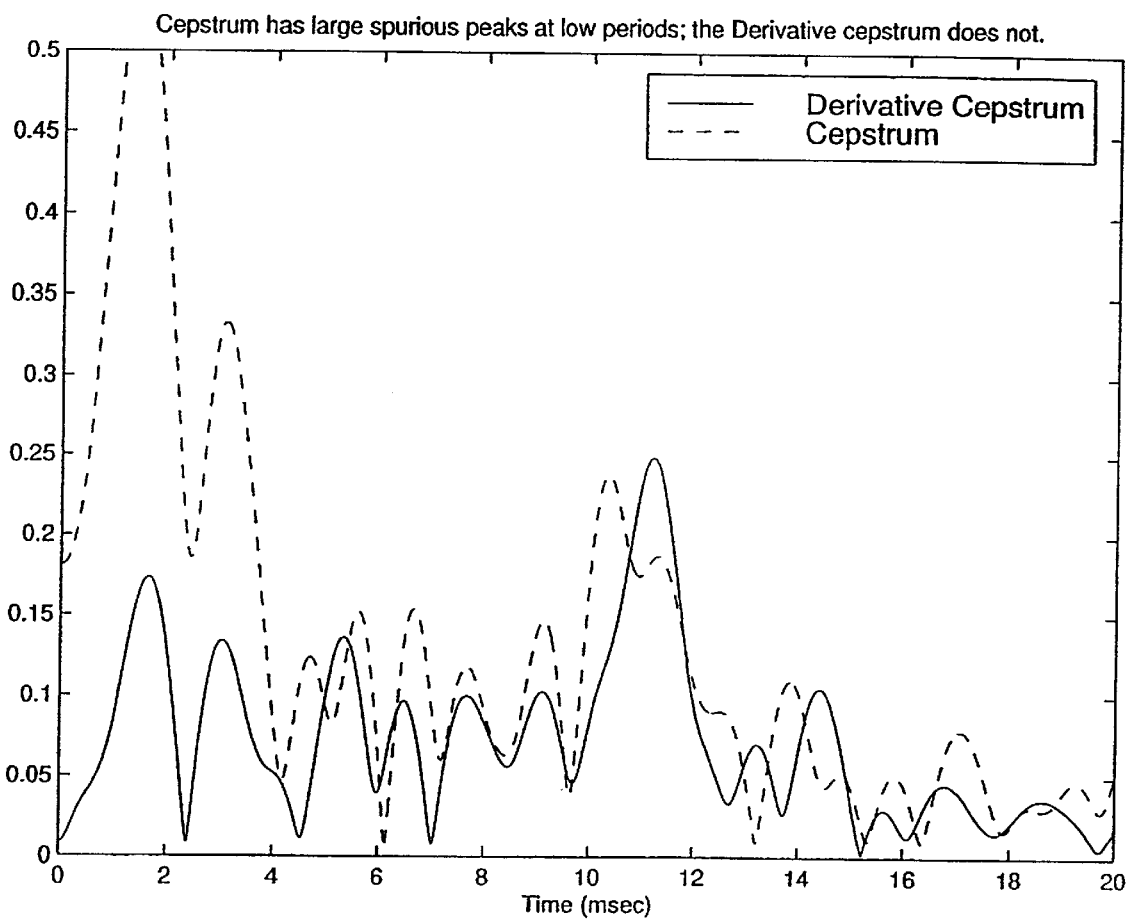
FIG. 2C depicts the properties of the cepstrum and derivative cepstrum at low frequencies.

The speech processing method 10 can also be used to obtain a pitch estimation of a speech signal. Optimal methods for determining pitch depend on the nature of the periodic speech signal. In the particular case that the speech signal spectrum has a harmonic stack with many components, a known pitch estimation technique is based on determination of the periodicity of the spectral peaks in the speech signal; the periodicity of spectral peaks is determined by using the signal cepstrum (i.e. the Fourier transform of the log of the speech spectrum). The cepstrum of the acoustic waveform of FIG. 2A is depicted in dashed lines in FIG. 2B. As explained above, the problem with cepstrum measurements is that at low periods, the cepstrum of an acoustic waveform is susceptible to noise. See for example, FIG. 2C where the cepstrum, shown in dashed lines, has large spurious peaks at low periods. These spurious peaks degrade pitch estimation.

In accordance with a preferred embodiment of the invention, it has been discovered that the Fourier transform of the derivative of the log of the speech spectrum can be used instead of the cepstrum for pitch estimation. The "derivative cepstrum" value is depicted in the solid line graph of FIG. 2C. As there shown, and unlike the cepstrum, the derivative does not posses spurious peaks at low periods. Thus, its use yields a more robust pitch estimate. Note that the derivative cepstrum is robustly obtained by using the smoothed derivative estimate of the spectrum described above.

The spectral derivative is estimated by computing the real component of "z" multiplied by $e^{i\theta}$ as set forth above and depicted in step 18 of FIG. 1. By setting $\theta=\pi/2$, a smooth estimate of the frequency derivative of the speech spectrogram can be obtained. The frequency derivative of the log spectrum is then calculated by dividing the frequency derivative by the speech spectrogram. These steps are depicted in step 20 of FIG. 1. Once the quantity is calculated, the Fourier transform of the logarithmic frequency derivative $C_D(t)$ is computed as shown in step 22 by $$C_D(\tau) = \int df \frac{\partial \log(S(f))}{\partial f} e^{2\pi i f t} \quad \text{Equation (6)}$$

wherein $S(f)$ is the speech spectrogram and $(t)$ is confined to a plausible range of pitches. A smoothness constraint may be imposed on the pitch trajectory, for example, using dynamic programming. A measure of the pitch estimate is given by the value of $C_D(t)$ at its maximum.

Another technique for estimating pitch in accordance with the present invention will now be described. Initially, Fourier transforms of the product of the Slepian functions and the speech signal fragment calculated in step 14 of the process 10 shown in FIG. 2 are computed. For a time series represented by a sinusoid at frequency $f_0$ with complex amplitude $\mu$ added to a process that is white on the frequency range $[f_0-W, f_0+W]$ for a select frequency range within the defined frequency range, the Fourier transforms of the speech signal windowed by the Slepian functions are given by:

$$\tilde{X}_k(f) = \mu U_k(f-f_0) + n_k(f), k=1,2, \ldots K \quad \text{Equation(7)}$$

where $U_k(f)$ is the Fourier transform of the $k^{th}$ prolate function, f is in the defined frequency range and $n_k(f)$ for k being an integer are identical independently distributed Gaussian variables given the assumption of a locally white background. At $f=f_0$, the above equation (7) is a linear regression in the complex plane having a slope which estimates the complex amplitude of the speech signal in the form of $$\mu(f_0) = \frac{\sum_k \tilde{x}_k(f_o)U_k(0)}{\sum_k |U_k(0)|^2} \quad \text{Equation (8)}$$

Calculation of this quantity corresponds to a Fourier transform windowed by a function that is an average of the K prolate functions. Explicitly, the window function, $v_t$, is given by $$v_t = \sum_k \alpha_k w_k(t) \quad \text{Equation (9)}$$

$$\alpha_k = \frac{\sum_t w_k(t)}{\sum_k \left(\sum_t w_k(t)\right)^2} \quad \text{Equation (10)}$$

where $W_k(t)$ is the $k_{th}$ prolate function indexed by time. The fit of the linear regression is measured by the standard F-statistic which quantifies the significance of a non-zero $\mu$ as $$F(f_o) = \frac{|\mu(f_o)|^2 / 2}{\sum_k |\tilde{X}_k(f_o) - \mu(f_o)U_k(0)| / (2k-2)} \quad \text{Equation (11)}$$

Figure 4A:
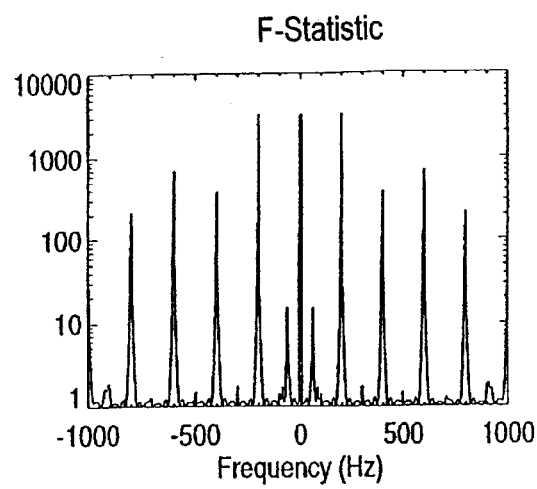
FIG. 4A illustrates the F-statistic for a speech spectrogram.
Figure 4B:
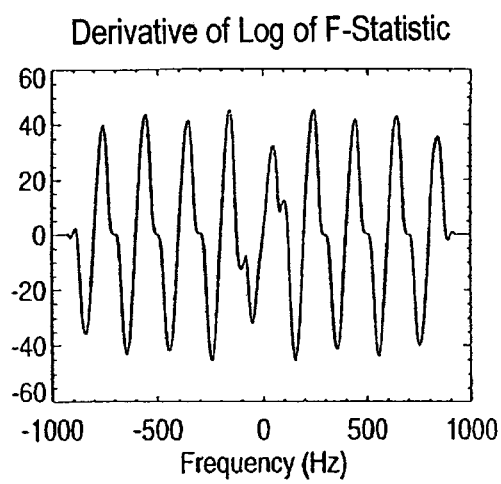
FIG. 4B depicts the derivative of the log of the F-statistic of FIG. 4A.
Figure 4C:
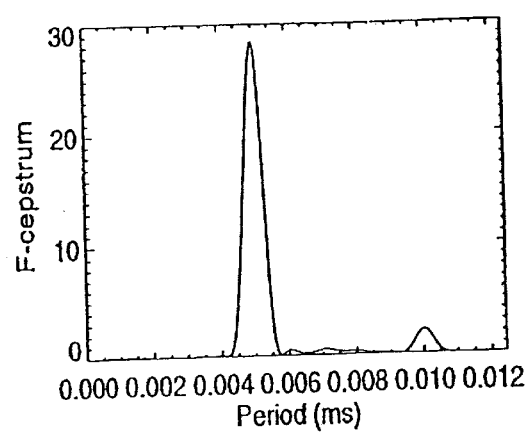
FIG. 4C illustrates the Fourier transform of FIG. 4B.

A plot of this quantity versus frequency on a log scale is shown in FIG. 4A; the quantity is termed "F-spectrum" and is calculated according to step 30 of FIG. 1. This F-spectrum is a non-linear positive function of the signal possessing large peaks at the line frequencies. The smoothed derivative of the logarithm of the F-spectrum is calculated in step 32. FIG. 4B shows the smooth derivative of the log F-spectrum, i.e. the derivative of the log of the F-spectrum shown in FIG. 4A. The sinusoidal structure in FIG. 4B results from the harmonic structure in the speech signal. Taking a Fourier transform of the derivative of the log of the F-spectrum of FIG. 4B results in the plot shown in FIG. 4C which is termed the "F-cepstrum" (step 32). This is a non-linear analog of the cepstrum. The maximum of the F-cepstrum located at the peak frequency provides a preliminary robust pitch estimate.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method of calculating an intermediate set of features, from a speech signal having a corresponding spectrogram, for use in speech recognition and coding techniques, comprising the steps of:

(A) calculating Slepian sequences for a selected length of time and over a selected frequency range;

(B) obtaining a product of a selected portion of the speech signal and said calculated Slepian sequences according to $$\tilde{x}_k(f) = \sum_1^N w_t(k)x_t e^{-2\pi i f t}$$

wherein $x_t$ represents the selected portion of the speech signal, $w_t(k)$ represents the calculated Slepian sequences and $\tilde{x}_k(f)$ represents the Fourier transform of the speech signal windowed by the calculated Slepian sequences, said selected portion having a time length equal to said selected length of time;

(C) calculating Fourier transforms of the product obtained from said step (B) to obtain multiple tapered Fourier transforms of the selected speech signal portion;

(D) calculating a frequency dependent quantity "z" from said multiple tapered Fourier transforms derived in step (C) by $$z(f) = \sum_{k=1}^{K-1} \tilde{x}_k^*(f)\tilde{x}_{k+1}(f)$$

and (E) utilizing the calculated frequency dependent quantity to calculate directional derivatives of the speech spectrogram in the time-frequency plane to define features for speech recognition and coding.

2. A of calculating an intermediate set of features, from a speech signal having a corresponding spectrogram, for use in speech recognition and coding techniques, comprising the steps of:

(A) calculating Slepian sequences for a selected length of time and over a selected frequency range;

(B) obtaining a product of a selected portion of the speech signal and said calculated Slepian sequences, said selected portion having a time length equal to said selected length of time;

(C) calculating Fourier transforms of the product obtained from said step (B) to obtain multiple tapered Fourier transforms of the selected speech signal portion;

(D) calculating a frequency dependent quantity "z" from said multiple tapered Fourier transforms derived in step (C);

(E) utilizing the calculated frequency dependent quantity to calculate directional derivatives of the speech spectrogram in the time-frequency plane to define features for speech recognition and coding; and calculating a pitch estimate of the speech signal by estimating the derivative of the log of the spectrogram by taking the calculated directional derivatives of the speech spectrogram in the time-frequency plane, setting the direction to be along the frequency axis so as to obtain an estimate of the frequency derivative of the spectrogram, dividing by the spectrogram to obtain a set of values and calculating the Fourier transform of said set of values to obtain a derivative cepstrum.

3. The method of claim 2, wherein the derivative cepstrum has a maximum value representative of a pitch estimate.

4. A method of calculating an intermediate set of features, from a speech signal having a corresponding spectrogram, for use in speech recognition and coding techniques, comprising the steps of:

(A) calculating Slepian sequences for a selected length of time and over a selected frequency range;

(B) obtaining a product of a selected portion of the speech signal and said calculated Slepian sequences, said selected portion having a time length equal to said selected length of time;

(C) calculating Fourier transforms of the product obtained from said step (B) to obtain multiple tapered Fourier transforms of the selected speech signal portion;

(D) calculating a frequency dependent quantity "z" from said multiple tapered Fourier transforms derived in step (C);

(E) utilizing the calculated frequency dependent quantity to calculate directional derivatives of the speech spectrogram in the time-frequency plane to define features for speech recognition and coding;

(F) calculating the F-statistic for the product of said step (B) as a function of frequency to obtain an F-spectrum of said product;

(G) obtaining a smoothed derivative of the logarithm of the F-spectrum;

(H) computing the Fourier transform of the result from step (G) to obtain the F-cepstrum; and (I) locating a maximum of the F-cepstrum to obtain a pitch estimate.

5. A method of estimating pitch of a speech signal for use in speech coding techniques, comprising the steps of:

(A) calculating Slepian sequences for a selected length of time and over a selected frequency range;

(B) obtaining a product of a selected portion of the speech signal and said calculated Slepian sequences, said selected portion having a time length equal to said selected length of time;

(C) calculating an F-statistic for the product of said step (B) as a function of frequency to obtain an F-spectrum of said product;

(D) obtaining the derivative of the log of the F-spectrum and calculating a Fourier transform thereof to obtain the F-cepstrum; and (E) locating a maximum of the F-cepstrum to obtain a pitch estimate.

6. A method of estimating pitch of a speech signal for use in speech coding techniques, comprising the steps of:

(A) calculating Slepian sequences for a selected length of time and over a selected frequency range;

(B) obtaining a product of a selected portion of the speech signal and said calculated Slepian sequences, said selected portion having a time length equal to said selected length of time;

(C) calculating the F-statistic for the product of said step (B) as a function of frequency to obtain an F-spectrum of said product;

(D) obtaining a smoothed derivative of the logarithm of the F-spectrum;

(E) computing the Fourier transform of the result from step (D) to obtain the F-cepstrum; and (F) locating a maximum of the F-cepstrum to obtain a pitch estimate.

7. The method of claim 6, wherein the product of said step (B) is obtained using $$\tilde{x}_k(f) = \sum_1^N w_t(k) x_t e^{-2\pi i f t}$$

wherein $x_t$ represents the selected portion of the speech signal, $w_t(k)$ represents the calculated Slepian sequences and $\tilde{x}_k(f)$ represents the Fourier transform of the speech signal windowed by the calculated Slepian sequences.

* * * * *